United States Patent
Brooks et al.

(10) Patent No.: US 12,451,220 B2
(45) Date of Patent: Oct. 21, 2025

(54) ESTABLISHING INDIVIDUAL ROOT OF TRUST USING BIOMARKERS

(71) Applicant: QUALCOMM Incorporated, San Diego, CA (US)

(72) Inventors: Emily Kathryn Brooks, Amherst, NY (US); Collin D'Souza, Amherst, NY (US); John Keith Schneider, Williamsville, NY (US); Alexei Stoianov, Toronto (CA); Shounak Uday Gore, Williamsville, NY (US); Rathin Radhakrishnan Nair, Tonawanda, NY (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 18/055,230

(22) Filed: Nov. 14, 2022

(65) Prior Publication Data
US 2024/0161884 A1    May 16, 2024

(51) Int. Cl.
*G16H 10/60*    (2018.01)
*G06F 18/213*   (2023.01)

(52) U.S. Cl.
CPC .......... *G16H 10/60* (2018.01); *G06F 18/213* (2023.01)

(58) Field of Classification Search
CPC .............................. G16H 10/60; G06F 18/213
See application file for complete search history.

(56) References Cited

U.S. PATENT DOCUMENTS

| | | | |
|---|---|---|---|
| 2013/0109947 A1* | 5/2013 | Wood | A61B 5/021 600/407 |
| 2013/0190589 A1* | 7/2013 | Chen | A61B 5/145 600/407 |
| 2015/0317855 A1* | 11/2015 | Sezan | G06F 21/35 340/5.52 |
| 2016/0183812 A1* | 6/2016 | Zhang | G07C 9/37 600/301 |
| 2017/0325748 A1* | 11/2017 | Natarajan | A61B 5/7282 |

(Continued)

FOREIGN PATENT DOCUMENTS

WO    WO-2017089189 A1 *    6/2017    ............. G06F 19/00

OTHER PUBLICATIONS

R. S. Choras, "Personal identification using forearm vein patterns," 2017 International Conference and Workshop on Bioinspired Intelligence (IWOBI), Funchal, Portugal, 2017, pp. 1-5, doi: 10.1109/IWOBI.2017.7985519. (Year: 2017).*

(Continued)

*Primary Examiner* — Sun M Li
(74) *Attorney, Agent, or Firm* — QUALCOMM Incorporated

(57) ABSTRACT

Systems and techniques are described herein for user identification. For instance, a technique can include receiving at least one biosignal from a sensor, the at least one biosignal indicative of a blood perfusion of a user. The technique can further include extracting at least one feature from the at least one biosignal, comparing the extracted at least one feature to at least one template feature associated with an enrolled user, determining, based on comparing the extracted at least one feature to the at least one template feature, whether the user matches the enrolled user, and outputting an indication of whether the user matches the enrolled user.

28 Claims, 10 Drawing Sheets

(56) References Cited

U.S. PATENT DOCUMENTS

| | | | | |
|---|---|---|---|---|
| 2018/0358113 | A1* | 12/2018 | Cronin | G06F 21/32 |
| 2019/0220642 | A1* | 7/2019 | Lu | G06V 40/1382 |
| 2019/0236253 | A1* | 8/2019 | Wang | H04M 1/02 |
| 2021/0286429 | A1* | 9/2021 | Azemi | G06N 3/045 |
| 2021/0303668 | A1* | 9/2021 | Bannerjee | A61B 5/117 |
| 2021/0409943 | A1* | 12/2021 | Bazargan | H04L 63/0861 |
| 2022/0175258 | A1* | 6/2022 | Kitchens | A61B 5/02116 |
| 2022/0358410 | A1* | 11/2022 | Neumann | G16H 10/40 |
| 2023/0284920 | A1* | 9/2023 | Yakishyn | G06F 3/0304 |

OTHER PUBLICATIONS

A. K. Jain, A. Ross and S. Prabhakar, "An introduction to biometric recognition," in IEEE Transactions on Circuits and Systems for Video Technology, vol. 14, No. 1, pp. 4-20, Jan. 2004, doi: 10.1109/TCSVT.2003.818349. (Year: 2004).*

G. K. Kyeremeh et al., "Finger vein Recognition," 2022 International Telecommunications Conference (ITC—Egypt), Alexandria, Egypt, 2022, pp. 1-5, doi: 10.1109/ITC-Egypt55520.2022.9855699. (Year: 2022).*

Y.-T. Zhang, Y.-L. Zheng, W.-H. Lin, H.-Y. Zhang and X.-L. Zhou, "Challenges and Opportunities in Cardiovascular Health Informatics," in IEEE Transactions on Biomedical Engineering, vol. 60, No. 3, pp. 633-642, Mar. 2013, doi: 10.1109/TBME.2013.2244892. (Year: 2013).*

Matthew P. Fronheiser, Sergey A. Ermilov, Hans-Peter F. Brecht, André Conjusteau, Richard Su, Ketan Mehta, Alexander A. Oraevsky, "Real-time optoacoustic monitoring and three-dimensional mapping of a human arm vasculature," J. Biomed. Opt. 15(2) 021305 (Mar. 1, 2010) https://doi.org/10.1117/1.3370336 (Year: 2010).*

Sun Y, Thakor N. Photoplethysmography Revisited: From Contact to Noncontact, From Point to Imaging. IEEE Trans Biomed Eng. Mar. 2016;63(3):463-77. doi: 10.1109/TBME.2015.2476337. Epub Sep. 15, 2015. PMID: 26390439; PMCID: PMC4822420. (Year: 2015).*

A. K. Jain, A. Ross and S. Prabhakar, "An introduction to biometric recognition," in IEEE Transactions on Circuits and Systems for Video Technology, vol. 14, No. 1, pp. 4-20, Jan. 2004, doi: 10.1109/TCSVT.2003.818349. (Year: 2004) (Year: 2004).*

Z. Gingl, G. Makan, J. Mellar, G. Vadai and R. Mingesz, "Phonocardiography and Photoplethysmography With Simple Arduino Setups to Support Interdisciplinary STEM Education," in IEEE Access, vol. 7, pp. 88970-88985, 2019, doi: 10.1109/ACCESS.2019.2926519. (Year: 2019).*

International Search Report and Written Opinion—PCT/US2023/079273—ISA/EPO—Feb. 13, 2024.

Pu L., et al., "Novel Robust Photoplethysmogram-Based Authentication", IEEE Sensors journal, IEEE, USA, vol. 22, No. 5, Jan. 24, 2022, pp. 4675-4686, XP011901414, Abstract, Introduction, Our proposed novel, PPG-based authentication system, Experiments, Conclusion.

* cited by examiner

ESTABLISHING INDIVIDUAL ROOT OF TRUST USING BIOMARKERS

FIELD

The present disclosure generally relates to biomarker evaluation (e.g., processing health related measurements to obtain data). For example, aspects of the present disclosure are related to systems and techniques for establishing a root of trust using biomarkers.

BACKGROUND

A variety of different sensing technologies and algorithms are being used in various biomedical applications, including health and wellness monitoring. As an example, a sensor may sample a user using a particular sensing technology and generate a biosignal. This biosignal may be processed using one or more algorithms to measure one or more biomarkers for the user. Increasingly, these sensors are being incorporated into devices that may be used outside of a medical setting, such as in a clinic or hospital. For example, various sensing technologies and algorithms may be incorporated into a portable, handheld, and/or wearable device (e.g., a sensing device).

As sensing devices become more available, these sensing devices are being used for long term or persistent monitoring. As an example, measuring blood pressure over a period of time may allow for more insights on whether a user really needs certain medications, or if a certain medication is appropriate for the user. One challenge to this long term or persistent monitoring involves verifying who is using the device. For example, it is difficult to say how a user's blood pressure is affected by some medication if a different user is wearing the sensor. While the sensor may be able to measure a biosignal about a user, existing systems may not be able to independently determine who the user being measured is.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below Systems and techniques are described for authentication of a user. For example, a system can establish a root of trust for an individual using biomarkers. In one illustrative example, an apparatus for user identification is provided. The apparatus comprises at least one memory comprising instructions and at least one processor (e.g., configured in circuitry) coupled to the at least one memory. The at least one processor is configured to: receive at least one biosignal from a sensor, the at least one biosignal indicative of a blood perfusion of a user; extract at least one feature from the at least one biosignal; compare the extracted at least one feature to at least one template feature associated with an enrolled user; determine, based on comparing the extracted at least one feature to the at least one template feature, whether the user matches the enrolled user; and output an indication of whether the user matches the enrolled user.

In another example, a method for user identification is provided. The method comprises receiving at least one biosignal from a sensor, the at least one biosignal indicative of a blood perfusion of a user; extracting at least one feature from the at least one biosignal; comparing the extracted at least one feature to at least one template feature associated with an enrolled user; determining, based on comparing the extracted at least one feature to the at least one template feature, whether the user matches the enrolled user; and outputting an indication of whether the user matches the enrolled user.

In another example, a non-transitory computer-readable medium is provided. The non-transitory computer-readable medium has stored thereon, instructions that, when executed by at least one processor, cause the at least one or more processors to: receive at least one biosignal from a sensor, the at least one biosignal indicative of a blood perfusion of a user; extract at least one feature from the at least one biosignal; compare the extracted at least one feature to at least one template feature associated with an enrolled user; determine, based on comparing the extracted at least one feature to the at least one template feature, whether the user matches the enrolled user; and output an indication of whether the user matches the enrolled user.

In another example, an apparatus for user identification is provided. The apparatus includes: means for receiving at least one biosignal from a sensor, the at least one biosignal indicative of a blood perfusion of a user; means for extracting at least one feature from the at least one biosignal; means for comparing the extracted at least one feature to at least one template feature associated with an enrolled user; means for determining, based on comparing the extracted at least one feature to the at least one template feature, whether the user matches the enrolled user; and means for outputting an indication of whether the user matches the enrolled user.

In another example, an apparatus for user identification is provided. The apparatus comprises at least one memory comprising instructions and at least one processor (e.g., configured in circuitry) coupled to the at least one memory. The at least one processor is configured to: obtain user identification information; receive at least one biosignal from a sensor, the at least one biosignal indicative of a blood perfusion of a user; extract at least one feature from the at least one biosignal; associate the extracted at least one feature with the obtained user identification information; and store the at least one feature as a template feature associated with the obtained user identification information to enroll the user.

In another example, a method for user identification is provided. The method comprises: obtaining user identification information; receiving at least one biosignal from a sensor, the at least one biosignal indicative of a blood perfusion of a user; extracting at least one feature from the at least one biosignal; associating the extracted at least one feature with the obtained user identification information; and storing the at least one feature as a template feature associated with the obtained user identification information to enroll the user.

In another example, a non-transitory computer-readable medium is provided. The non-transitory computer-readable medium has stored thereon, instructions that, when executed by at least one processor, cause the at least one or more processors to: receive at least one biosignal from a sensor, the at least one biosignal indicative of a blood perfusion of a user; extract at least one feature from the at least one biosignal; associate the extracted at least one feature with the obtained user identification information; and store the at least one feature as a template feature associated with the obtained user identification information to enroll the user.

In another example, an apparatus for user identification is provided. The apparatus includes: means for obtaining user identification information; means for receiving at least one biosignal from a sensor, the at least one biosignal indicative of a blood perfusion of a user; means for extracting at least one feature from the at least one biosignal; means for associating the extracted at least one feature with the obtained user identification information; and means for storing the at least one feature as a template feature associated with the obtained user identification information to enroll the user.

In some aspects, the apparatus comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
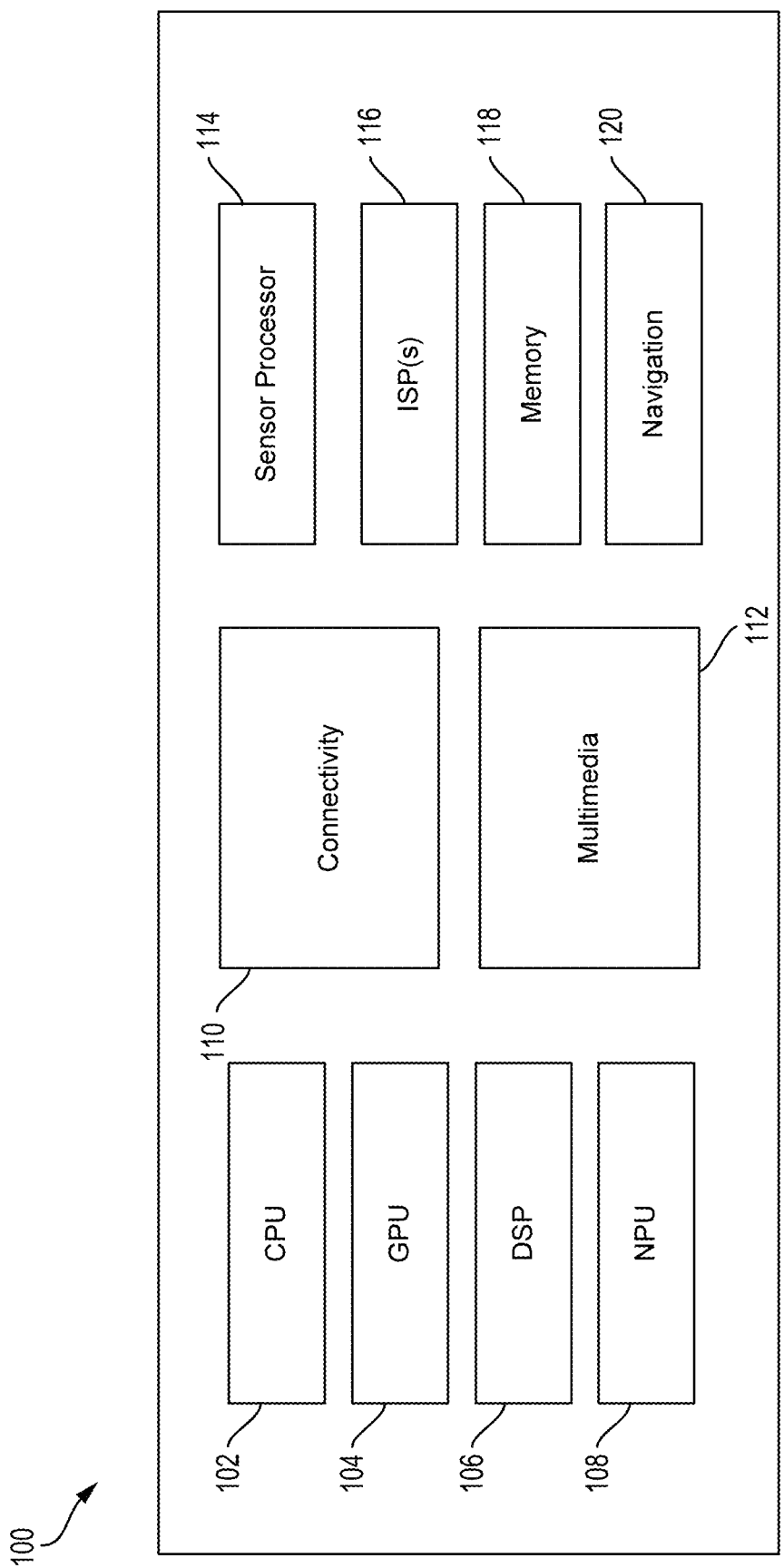
FIG. 1 illustrates an example implementation of a system-on-a-chip (SOC), in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

As noted previously, it can be challenging to verify a user that is using a device when performing long term or persistent monitoring of one or more biomarkers for the user. In some cases, a user may enable access into a system by another user. For example, a first user may unlock the system, and a second user may then provide the biometric measurement. In another example, a patient may provide false information by submitting biosignal measurements from another user. This problem can be referred to as Root of Trust Identification.

Systems, apparatuses, electronic devices, methods (also referred to as processes), and computer-readable media (collectively referred to herein as "systems and techniques") are described herein for establishing a root of trust using biomarkers. For example, blood can flow through a human body though various blood vessels (e.g., arteries, veins, etc.), each of which exhibit unique blood volume changes over time. The systems and techniques can detect the blood volume changes and characterize these changes as blood perfusion data. The systems and techniques can use the blood perfusion data to determine one or more biomarkers. As an arrangement of blood vessels may vary as between persons, the blood perfusion data can also vary from person to person. The systems and techniques can exploit this variation to uniquely identify a user based on the blood perfusion data. For example, features of the blood perfusion data may be extracted to generate template features associated with a user. The template features may be generated during an enrollment process, that allows the user to use a sensor (or a device associated with the sensor) to obtain blood perfusion data.

Later, during an identification process, the sensor may generate blood perfusion data for a user of the sensor. Features of the blood perfusion data may be extracted and compared against template features associated with users enrolled to use the sensor. Based on the comparison, the user of the sensor may be identified as an enrolled user.

Various aspects of the present disclosure will be described with respect to the figures. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

SOC 100 and/or components thereof may be configured to evaluate biomarkers. For example, the sensor processor 114 may receive and/or process biomarker information from sensors, such as one or more photoacoustic (PA) sensor (not shown) of a device. In some cases, the sensor processor 114 may also receive, as input, output of one or more processing blocks of the connectivity block 110. Additional processing of the biomarker input may be performed by other components of the SOC 100 such as the CPU 102, DSP 106, and/or NPU 108.

Figure 2:
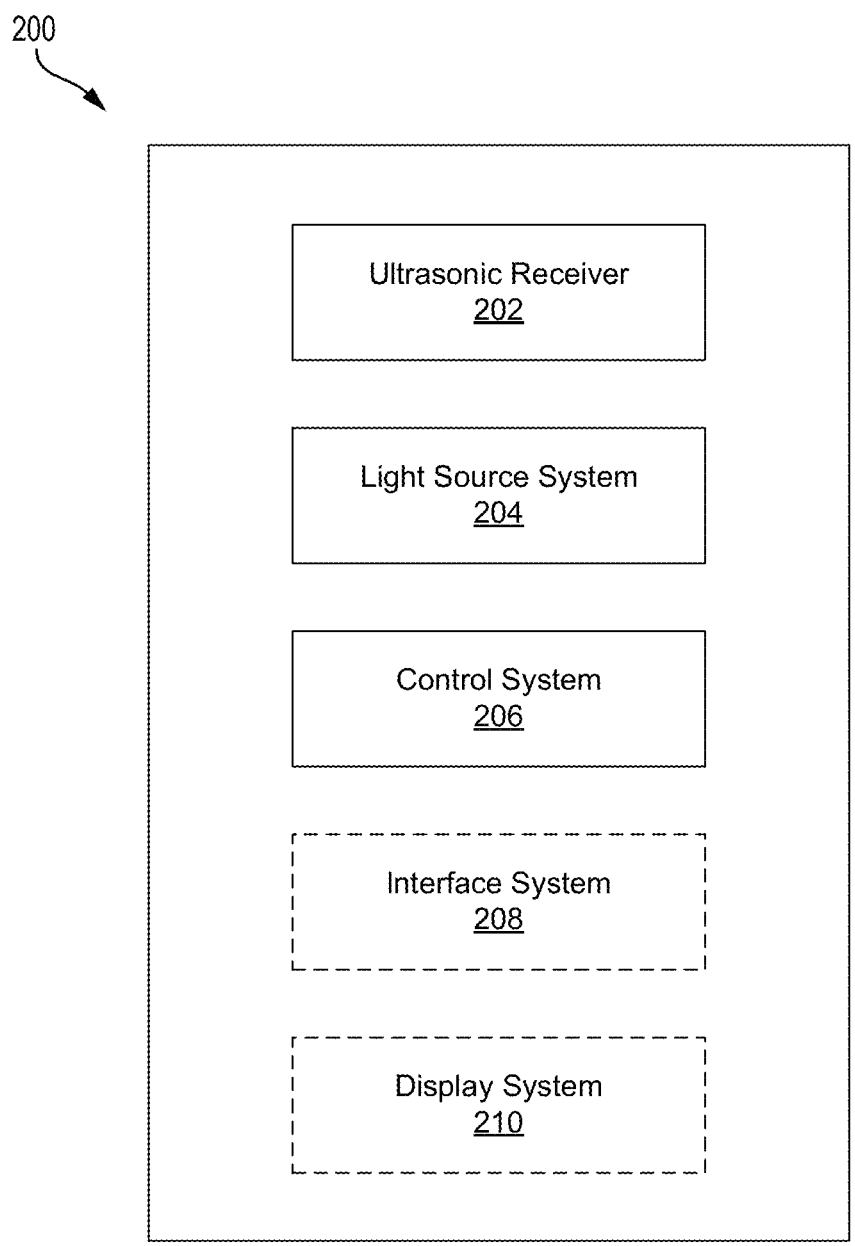
FIG. 2 is a block diagram illustrating an example biomarker sensor system, in accordance with aspects of the present disclosure.

To evaluate biomarkers, it may be useful to obtain biomarker data, such as from a biomarker sensor or biomarker sensor system. FIG. 2 is a block diagram illustrating an example biomarker sensor system 200, in accordance with aspects of the present disclosure. In some cases, biomarker sensor system 200 may be a blood perfusion sensor system. The blood perfusion sensor system may be a PA plethysmography (PAPG) type sensor system. In some cases, the PAPG sensor system may be configured to obtain blood perfusion data from a subject. Example biomarker sensor system 200 includes an ultrasonic receiver 202, a light source system 204 and a control system 206. In some cases, the biomarker sensor system 200 may include a substrate. In some examples, the biomarker sensor system 200 may include a platen. Optionally, some biomarker sensor systems 200 may include an interface system 208 and/or a display system 210.

In some cases, the ultrasonic receivers 202 may include, or be configured (or configurable) as, an ultrasonic transmitter. In some implementations the ultrasonic receiver 202 and an ultrasonic transmitter may be combined in an ultrasonic transceiver. In some cases, the ultrasonic receiver 202 may include a piezoelectric receiver layer, such as a layer of polyvinylidene fluoride (PVDF) polymer or a layer of Poly (vinylidene fluoride-co-trifluoroethylene) (PVDF-TrFE) copolymer. In some implementations, a single piezoelectric layer may serve as an ultrasonic receiver. In some implementations, other piezoelectric materials may be used in the piezoelectric layer, such as aluminum nitride (AlN) or lead zirconate titanate (PZT). The ultrasonic receiver 202 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some examples, the ultrasonic receiver 202 may be, or may include, an ultrasonic receiver array. In some examples, the biomarker sensor system 200 may include one or more separate ultrasonic transmitter elements. In some such examples, the ultrasonic transmitter(s) may include an ultrasonic plane-wave generator.

In some cases, the light source system 204 may include an array of light-emitting diodes. In some implementations, the light source system 204 may include one or more laser diodes. According to some implementations, the light source system may include at least one infrared, red, green, blue, white or ultraviolet light-emitting diode. In some implementations, the light source system 204 may include one or more laser diodes. For example, the light source system 204 may include at least one infrared, red, green, blue, white or ultraviolet laser diode. In some implementations, the light source system 204 may include one or more organic LEDs (OLEDs).

In some implementations, the light source system 204 may be configured for emitting various wavelengths of light, which may be selectable in order to achieve greater penetration into biological tissue and/or to trigger acoustic wave emissions primarily from a particular type of material. For example, because near-infrared (near-IR) light is not as strongly absorbed by some types of biological tissue (such as melanin and blood vessel tissues) as relatively shorter wavelengths of light, in some implementations the light source system 204 may be configured for emitting one or more wavelengths of light in the near IR range, in order to obtain photoacoustic emissions from relatively deep biological tissues. In some such implementations the control system 206 may control the wavelength(s) of light emitted by the light source system 204 to be in the range of 750 to 850 nm, e.g., 808 nm. However, hemoglobin does not absorb near-IR light as much as hemoglobin absorbs light having shorter wavelengths, e.g., ultraviolet, violet, blue or green light. Near-IR light can produce suitable photoacoustic emissions from some blood vessels (e.g., 1 mm in diameter or larger), but not necessarily from very small blood vessels. In order to achieve greater photoacoustic emissions from blood in general and from smaller blood vessels in particular, in some implementations the control system 206 may control the wavelength(s) of light emitted by the light source system 204 to be in the range of 495 to 570 nm, e.g., 520 nm or 532 nm. Wavelengths of light in this range are more strongly absorbed by biological tissue and therefore may not penetrate the biological tissue as deeply, but can produce relatively stronger photoacoustic emissions in blood than near-IR light.

In some examples the control system 206 may control the wavelength(s) of light emitted by the light source system 204 to preferentially induce acoustic waves in blood vessels, other soft tissue, and/or bones. For example, an infrared (IR) light-emitting diode LED may be selected and a short pulse of IR light emitted to illuminate a portion of a target object and generate acoustic wave emissions that are then detected by the ultrasonic receiver 202. In another example, an IR LED and a red LED or other color such as green, blue, white or ultraviolet (UV) may be selected and a short pulse of light emitted from each light source in turn with ultrasonic images obtained after light has been emitted from each light source. In other implementations, one or more light sources of different wavelengths may be fired in turn or simultaneously to generate acoustic emissions that may be detected by the ultrasonic receiver. Image data from the ultrasonic receiver that is obtained with light sources of different wavelengths and at different depths (e.g., as discussed in detail below) into the target object may be combined to determine the location and type of material in the target object. Image contrast may occur as materials in the body generally absorb light at different wavelengths differently. As materials in the body absorb light at a specific wavelength, they may heat differentially and generate acoustic wave emissions with sufficiently short pulses of light having sufficient intensities. Depth contrast may be obtained with light of different wavelengths and/or intensities at each selected wavelength. That is, successive images may be obtained at a fixed acquisition time delay or range gate delay (RGD) (which may correspond with a fixed depth into the target object) with varying light intensities and wavelengths to detect materials and their locations within a target object. For example, hemoglobin, blood glucose and/or blood oxygen within a blood vessel inside a target object such as a finger may be detected photoacoustically.

According to some implementations, the light source system 204 may be configured for emitting a light pulse with a pulse width less than about 100 nanoseconds. In some implementations, the light pulse may have a pulse width between about 10 nanoseconds and about 500 nanoseconds or more. According to some examples, the light source system may be configured for emitting a plurality of light pulses at a pulse repetition frequency between 10 Hz and 100 kHz. Alternatively, or additionally, in some implementations the light source system 204 may be configured for emitting a plurality of light pulses at a pulse repetition frequency between about 1 MHz and about 100 MHz. Alternatively, or additionally, in some implementations the light source system 204 may be configured for emitting a plurality of light pulses at a pulse repetition frequency between about 10 Hz and about 1 MHz. In some examples, the pulse repetition frequency of the light pulses may correspond to an acoustic resonant frequency of the ultrasonic receiver and the substrate. For example, a set of four or more light pulses may be emitted from the light source system 204 at a frequency that corresponds with the resonant frequency of a resonant acoustic cavity in the sensor stack, allowing a build-up of the received ultrasonic waves and a higher resultant signal strength. In some implementations, filtered light or light sources with specific wavelengths for detecting selected materials may be included with the light source system 204. In some implementations, the light source system may contain light sources such as red, green and blue LEDs of a display that may be augmented with light sources of other wavelengths (such as IR and/or UV) and with light sources of higher optical power. For example, high-power laser diodes or electronic flash units (e.g., an LED or xenon flash unit) with or without filters may be used for short-term illumination of the target object.

The control system 206 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 206 also may include (and/or be configured for communication with) one or more memory devices, such as one or more random access memory (RAM) devices, read-only memory (ROM) devices, etc. Accordingly, the biomarker sensor system 200 may have a memory system that includes one or more memory devices, though the memory system is not shown in FIG. 2. The control system 206 may be configured for controlling the light source system 204 and receiving and processing data from the ultrasonic receiver 202, e.g., as described above. If the biomarker sensor system 200 includes an ultrasonic transmitter, the control system 206 may be configured for controlling the ultrasonic transmitter. In some implementations, functionality of the control system 206 may be partitioned between one or more controllers or processors, such as a dedicated sensor controller and an applications processor of a mobile device.

Some implementations of the biomarker sensor system 200 may include the interface system 208. In some examples, the interface system 208 may include a wireless interface system. For example, the interface system 208 may be remote from one or more external devices and the interface system 208 may transmit, via the wireless interface, one or more biosignals generated by, for example, the ultrasonic receiver 202. In some implementations, the interface system 208 may include a user interface system, one or more network interfaces, one or more interfaces between the control system 206 and a memory system and/or one or more interfaces between the control system 206 and one or more external device interfaces (e.g., ports or applications processors).

According to some examples, the biomarker sensor system 200 may include a display system 210 that includes one or more displays. For example, the display system 210 may include one or more LED displays, such as one or more organic LED (OLED) displays.

In some cases, the biomarker sensor system 200 may be configured to measure a variety of biomarkers, for example based on blood perfusion information obtained by the biomarker sensor system. Examples of biomarkers the biomarker sensor system 200 may be configured to measure may include blood pressure, heart rate, respiration rate, pulse oxygen, heart rate variability, among other similar biomarkers. As an example, the biomarker sensor system 200 may be configured to cause the light source system 204 to emit certain light pulses and/or frequency(ies) of light at certain intensities and/or times to detect and measure various materials in a target object in order to measure a specific biomarker. In some cases, the biomarker sensor system 200 may be configured to measure any number of biomarkers. As an example, a biomarker sensor system 200 may be configured to measure blood pressure of a subject. As used herein, the term "blood pressure" is a general term referring to a pressure in the arterial system of a subject.

Figure 3:
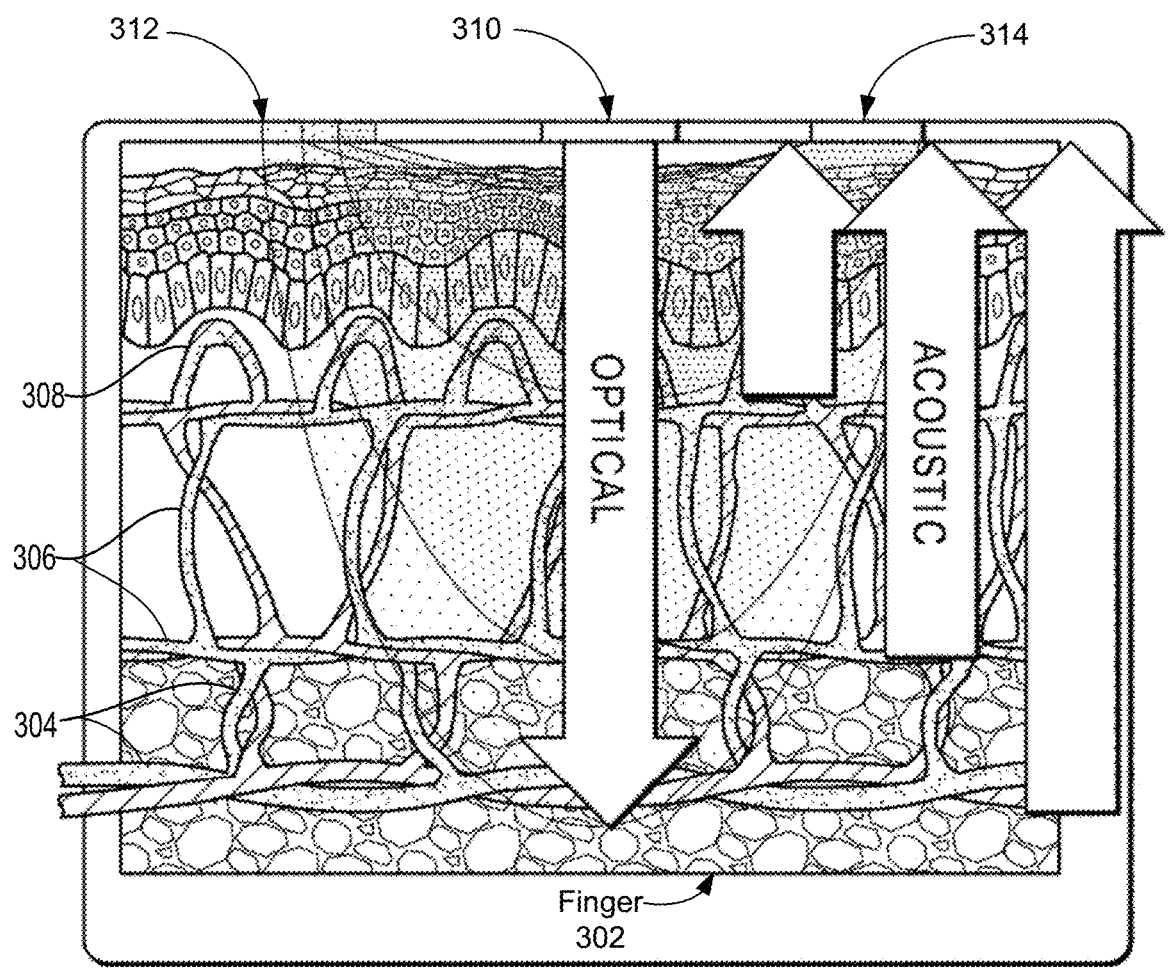
FIG. 3 illustrates an example process for blood pressure monitoring based on a biomarker sensor system, in accordance with aspects of the present disclosure.

FIG. 3 illustrates an example process 300 for blood pressure monitoring based on a biomarker sensor system, in accordance with aspects of the present disclosure. As shown in FIG. 3 a finger 302 of a subject may include various components such as arteries/veins 304, arterioles/venules 306, and capillaries 308 inside the finger 302. In some examples, a light source 310 may be, or may include, one or more LEDs or laser diodes. In example process 300, the light source 310 has transmitted light (in some examples, green, red, and/or near-infrared (NIR) light) that has penetrated the tissues of the finger 302 in an illuminated zone 312.

In some cases, blood vessels (and components of the blood itself) may be heated by the incident light from the light source 310 and in turn may emit acoustic waves. In this example, the emitted acoustic waves include ultrasonic waves. In some cases, the acoustic wave emissions are being detected by an ultrasonic receiver 314. In some cases, the ultrasonic receiver 314 may be a piezoelectric receiver. Photoacoustic emissions from the illuminated tissues, detected by the piezoelectric receiver, may be used to detect volumetric changes in the blood of the illuminated zone 312 of the finger 302 that correspond to heart rate waveforms.

Figure 4A:
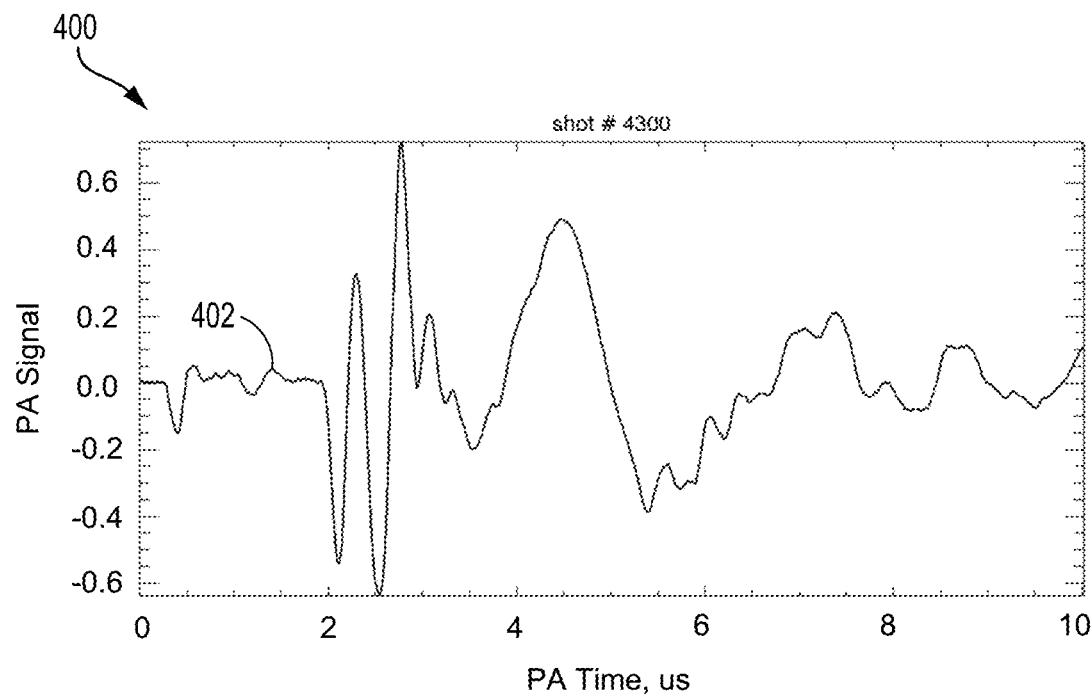
FIG. 4A is a chart of a raw PAPG signal received by an ultrasonic receiver of a blood perfusion sensor, in accordance with aspects of the present disclosure.
Figure 4B:
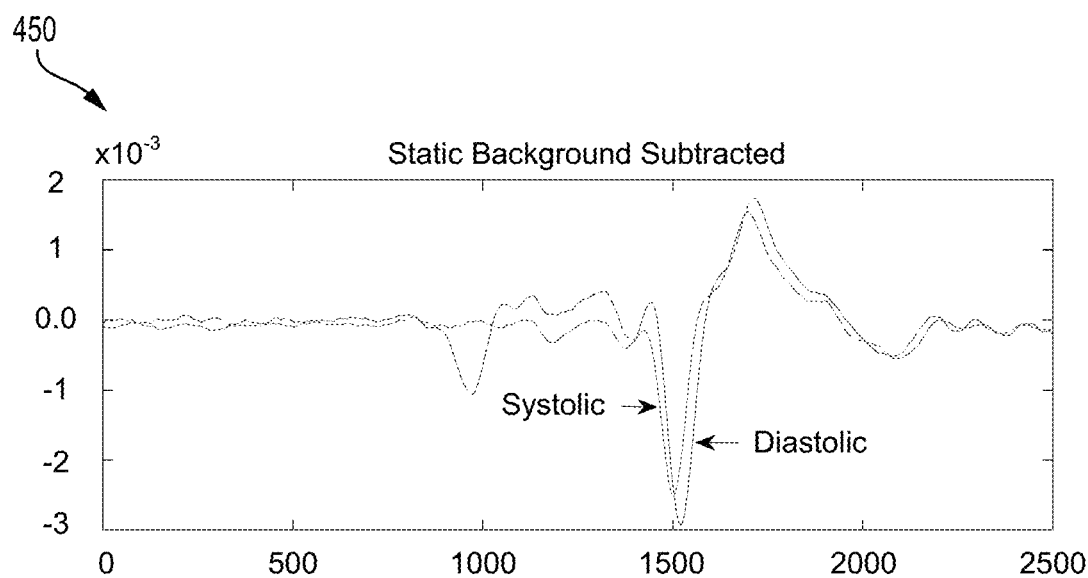
FIG. 4B is a chart of filtered PAPG signals received by an ultrasonic receiver, in accordance with aspects of the present disclosure.

FIG. 4A is a chart 400 of a raw PAPG signal 402 received by an ultrasonic receiver, such as ultrasonic receiver 314 of FIG. 3, of a blood perfusion sensor, in accordance with aspects of the present disclosure. In chart 400, the raw PAPG signal 402 may be a sinusoidal waveform with the y-axis centered around a 0-value point. In some cases, the PAPG signal 402 may be filtered (e.g., to subtract background and/or irrelevant data) to obtain one or more target biomarkers, such as blood pressure information, as shown in chart 450 of FIG. 4B. Note, chart 450 overlays two filtered PAPG signals captured at different times to illustrate blood pressure at different phases. In some examples, the ultrasonic receiver 314 may correspond to the ultrasonic receiver 202 that is described below with reference to FIG. 2.

In some cases, for PAPG-based process, acoustic waves travel more slowly than reflected light waves. Accordingly, depth discrimination based on the arrival times of the acoustic waves may be used. Depth discrimination based on the arrival times of the light waves may be substantially more difficult due to the speed at which light is reflected at such short distances. This depth discrimination may allow acoustic waves received from the different blood vessels to be isolated. In some examples, such depth discrimination allows artery heart rate waveforms to be distinguished from vein heart rate waveforms and other heart rate waveforms for blood pressure estimation.

In some cases, information used to generate one or more biomarker measurements, such as blood perfusion information generated by a PAPG sensor, may also be used to uniquely identify the subject. As a wearable and/or sensor for measuring biomarkers may be transferred between subjects (e.g., users), a technique that allows a subject to be uniquely identified biometrically based on data obtained by a biomarker sensor system may be useful for providing root of trust identification of the subject. In some cases, blood perfusion data from a subject collected by a PAPG sensor system may be used to uniquely identify the subject. For example, the various troughs, peaks, position, and amplitudes of the troughs and peaks in PAPG signals, such as PAPG signal 402, are based on how blood flows through blood vessels of an area of a subject.

In some cases, the blood flow information collected from a subject may be used to uniquely identify the subject. For example, features of one or more received PAPG signals, which characterize blood flow of the subject, may be identified and matched against enrolled template features for a subject. In some cases, features may be extracted from multiple PAPG signals, received over a period of time for comparison. Any quantifiable feature of the PAPG signals may be used for identifying the subject. In some cases, features of the PAPG signal that may be used to identify the subject may include peak-to-peak amplitude measurement for segments of the PAPG signal, an angle measurement for the segments, zero-crossings of the PAPG signal, and a 2D-pattern of the PAPG signal over time. It may be understood that while discussed in context with blood perfusion information generated using a 2-D image from stacked signals obtained by a PAPG sensor, the techniques discussed herein may be applicable to signals received from other sensor systems capable of characterizing blood perfusion of a subject.

Figure 5:
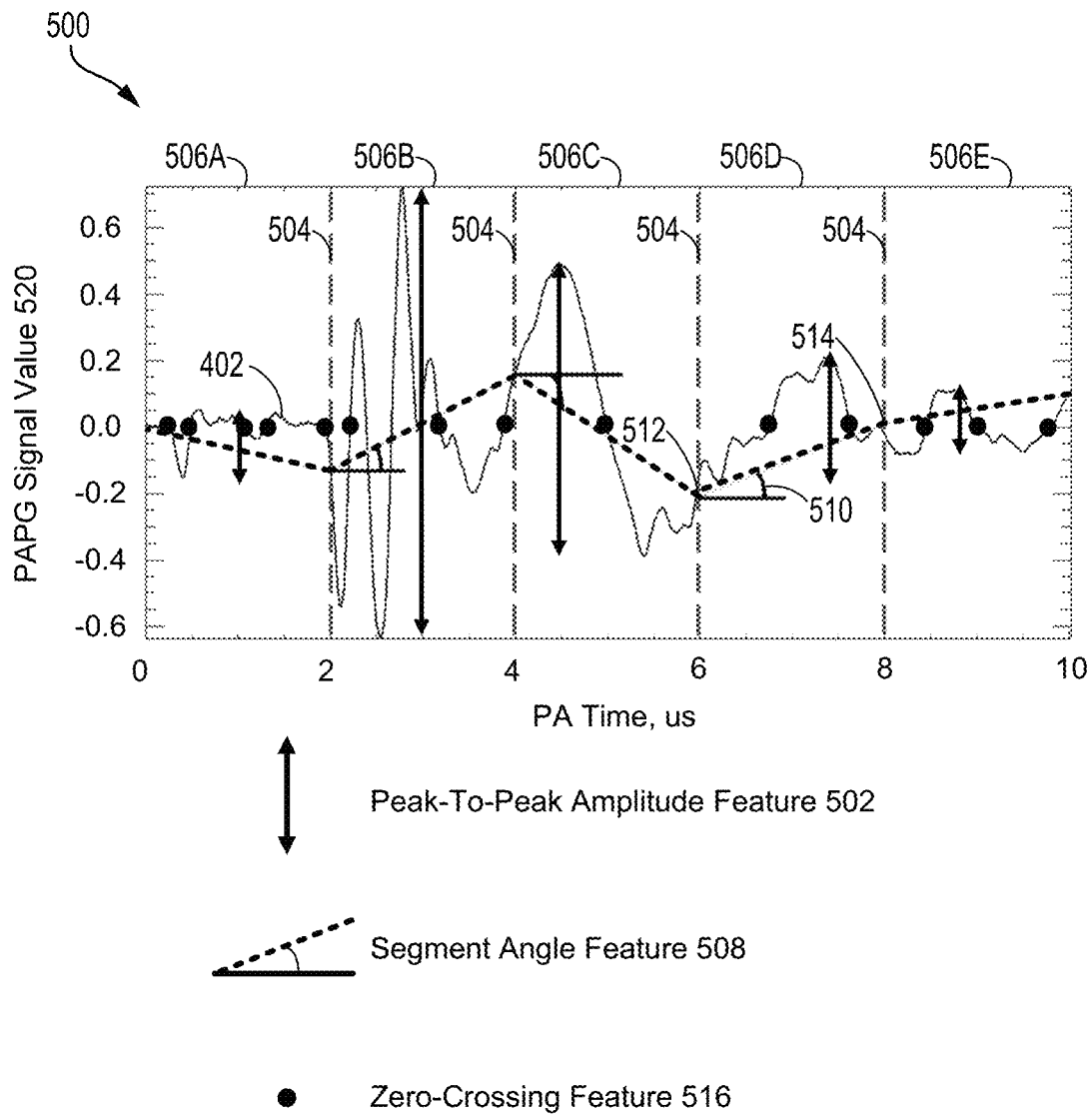
FIG. 5 is a diagram illustrating feature extraction for a PAPG signal, in accordance with aspects of the present disclosure.

FIG. 5 is a diagram 500 illustrating feature extraction for a PAPG signal 402, in accordance with aspects of the present disclosure. In some cases, multiple features may be extracted from the PAPG signal 402. According to some implementations, a peak-to-peak amplitude feature 502 may be determined for segments 506A-506E (collectively 506) of the PAPG signal 402. For example, the PAPG signal 402 may be divided into segments 506. In some cases, the segments 506 may be based on a certain number amount of time, number of samples (e.g., pixels), etc., of the PAPG signal 402. For example, a PAPG signal may be generated by sampling, via an acoustic wave receiver, over a period of time. The samples, collectively, make up the PAPG signal 402, and if charted, as shown in diagram 500, each pixel of the charted PAPG signal 402 may represent a sample received at a particular time. A certain number of pixels (e.g., symbols) may be grouped together into a segment 506. In some cases, symbols received within a certain time period may be grouped together into a segment 506. In some cases, reception of acoustic waves over a relatively slow period of time, as compared to light, helps allow for depth discrimination and segmenting the charted PAPG signal 402 over a period of time helps divide the PAPG signal 402 based on a depth.

Diagram 500 includes boundaries 504 dividing the PAPG signal into five segments 506A-506E of 2 µs. An exact size of a segment 506 may be determined experimentally and may vary from example to example. The peak-to-peak amplitude feature 502 may be determined, in some cases, based on a distance between a highest value of the PAPG signal 402 and the lowest value of the PAPG signal 402 in a segment 506. A peak-to-peak amplitude feature 502 may be determined for each segment 506. In some cases, the peak-to-peak amplitude feature 502 may be stored in the template features associated with the user for comparison.

According to some implementations, a segment angle feature 508 may be determined for the segments 506 of the PAPG signal 402. In some cases, the segment angle feature 508 may be determined based on a slope between a PAPG signal value 520 at a beginning of a segment and the PAPG signal value 520 at an end of the segment. For example, for segment 506D, a segment angle feature 508 may be determined based on slope 510 between a segment beginning PAPG signal value 512 at the beginning of segment 506D and a segment ending PAPG signal value 514 at the end of segment 506D. In some cases, a segment angle feature 508 may be determined for each segment 506 of the PAPG signal 402. In other cases, a segment angle feature 508 may be determined for a subset of the segments 506 of the PAPG signal 402. In some cases, one or more segment angle features 508 may be stored in the template features associated with the user for comparison.

In some cases, zero-crossing features 516 of the PAPG signal 402 may be extracted. The zero-crossing features 516 may be based on a number and/or a relative location of where the PAPG signal value 520 is equal to zero. For example, a number of zero-crossing features 516 per segment may be determined, or a relative location of a zero-crossing feature 516 as compared to the PAPG signal value 520 at a beginning of a segment and/or the PAPG signal value 520 at an end of the segment may be determined. In some cases, the number and or relative location of the zero-crossing features 516 may be stored in the template features associated with the user for comparison.

In some cases, a 2D-pattern of the biosignal over time may be extracted as a feature. For example, a number of PAPG signals may be received over a period of time and/or at a certain interval for a period of time, and these PAPG signals may be stacked to form an expected range of values for the biosignal. An obtained PAPG signal from a user may be conceptually overlaid with the stacked PAPG signal to see if the obtained PAPG signal falls within the stacked PAPG signal by comparing the obtained PAPG signal with the expected range of values. In some cases, the expected range of values for the PAPG signal may be stored in the template features associated with the user for comparison.

In some cases, PAPG signals obtained at different times may vary, for example, as blood flows through the subject change due to heart cycle phases, vasodilation, etc. To help minimize variations due to such changes in blood flow, multiple PAPG signals may be obtained over a period of time and these multiple PAPG signals may be stacked, averaged, or otherwise combined for feature extraction. Thus, in some cases, the PAPG signal 402 shown in diagram 500 may be generated based on multiple combined PAPG signals obtained over a period of time.

Figure 6:
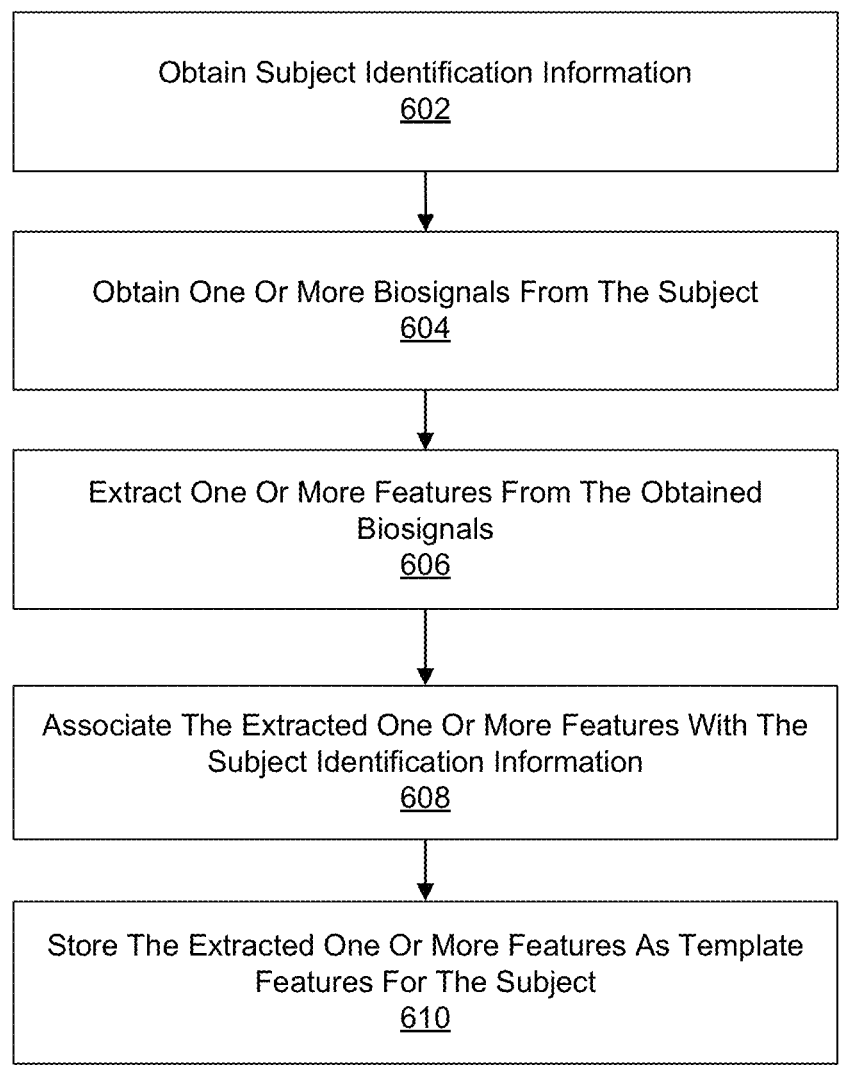
FIG. 6 is a flow diagram illustrating an enrollment procedure, in accordance with aspects of the present disclosure.

In some cases, extracted features may be used during an enrollment procedure and/or during an identification procedure. FIG. 6 is a flow diagram 600 illustrating an enrollment procedure, in accordance with aspects of the present disclosure. In some cases, a subject (e.g., user) may perform an enrollment procedure prior to use a biomarker sensor, such as a blood perfusion sensor, for subject identification. The enrollment procedure may generate template features for the enrolled subject and these template features may be used as a point of comparison for subject identification during the identification procedure. At block 602, subject identification information may be obtained. For example, during the enrollment procedure, a subject may provide identification information, such as a user identifier, name, age, etc. In some cases, the identification information may be linked to a user identity, but may not directly identify a user, such as a user identifier number, account number, or hash. At block 604, one or more biosignals may be obtained from the subject. For example, a biomarker sensor such as a blood perfusion sensor like a PAPG sensor may be used to obtain biosignals. At block 606, one or more features may be extracted from the one or more biosignals. Any quantifiable feature of the biosignals may be extracted. In some cases, features of the biosignal that may be used to identify the subject may include peak-to-peak amplitude measurement for segments of the biosignal, an angle measurement for the segments, zero-crossings of the biosignal, and/or a 2D-pattern of the biosignal over time. In some cases, blocks 604 and 606 may be repeated any number of times to obtain multiple sets of extracted features. In some cases, multiple sets of extracted features may be fused into a single set of extracted one or more features. In other cases, the multiple sets of extracted features may be used to train a machine learning model or statistical model of the extracted features and the trained machine learning or statistical model may represent the extracted one or more features. At block 608, the extracted one or more features may be associated with the subject identification information. At block 610, the extracted one or more features may be stored as the template features for the subject. In some cases, multiple features may be extracted and stored as the template features.

Figure 7:
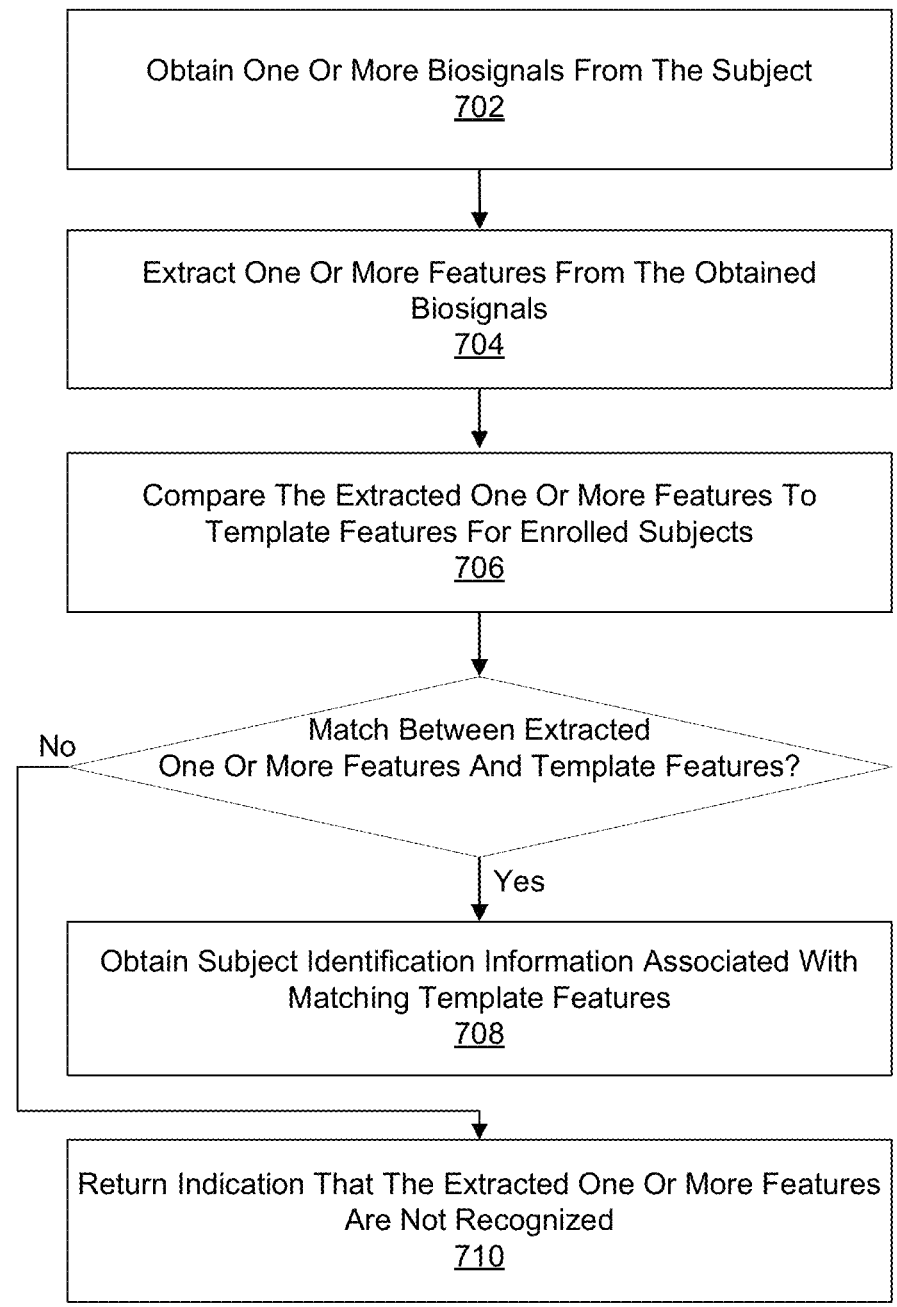
FIG. 7 is a flow diagram illustrating an identification procedure, in accordance with aspects of the present disclosure.

FIG. 7 is a flow diagram 700 illustrating an identification procedure, in accordance with aspects of the present disclosure. In some cases, once enrolled, a subject may be identified using an identification procedure. In some cases, the identification procedure may compare extracted features from the biosignal to enrolled template features for subjects to identify a subject. At block 702, one or more biosignals may be obtained from the subject. For example, a biomarker sensor, such as blood perfusion sensor like a PAPG sensor may be used to obtain biosignals. At block 704, one or more features may be extracted from the one or more biosignals. Any quantifiable feature of the biosignals may be extracted. In some cases, features of the biosignal that may be used to identify the subject may include peak-to-peak amplitude measurement for segments of the biosignal, an angle measurement for the segments, zero-crossings of the biosignal, and/or a 2D-pattern of the biosignal over time. In some cases, multiple features may be extracted from the biosignal.

At block 706, the extracted one or more features may be compared to template features for enrolled subjects. In some cases, the comparison may be a statistical comparison to determine whether the extracted one or more features are within a certain statistical distance or threshold distance from template features for enrolled subjects. In some cases, statistical comparisons for multiple features may be performed and then combined to determine whether the extracted one or more features are statistically similar to the template features for enrolled subjects. In other cases, the template features may be represented by a statistical model or machine learning model and the statistical or machine learning model may be run as against the extracted one or more features to compare the extracted one or more features to the template features for enrolled subjects. At block 708, if the comparison of the extracted one or more features to the template features indicates a match, then subject identification information associated with matching template features may be obtained. Otherwise, at block 710, an indication that the extracted one or more features are not recognized may be returned.

In some cases, subject identification based on blood perfusion information may be combined with another biometric identification technique. Combining multiple subject identification techniques may help increase resistance to spoofing or other hacking attempts. For example, fingerprint readers generally look for specific patterns in ridges and valleys on a finger. However, fingerprint readers typically do not have a mechanism by which to determine whether the ridges and valleys presented to the fingerprint reader is from a live finger or a nonliving spoof, such as a thin film mold, image spoof, etc. However, combined with blood perfusion information, use of the nonliving spoof becomes highly improbable as the blood perfusion information from the nonliving spoof is unlikely to match that of a target subject.

Figure 8:
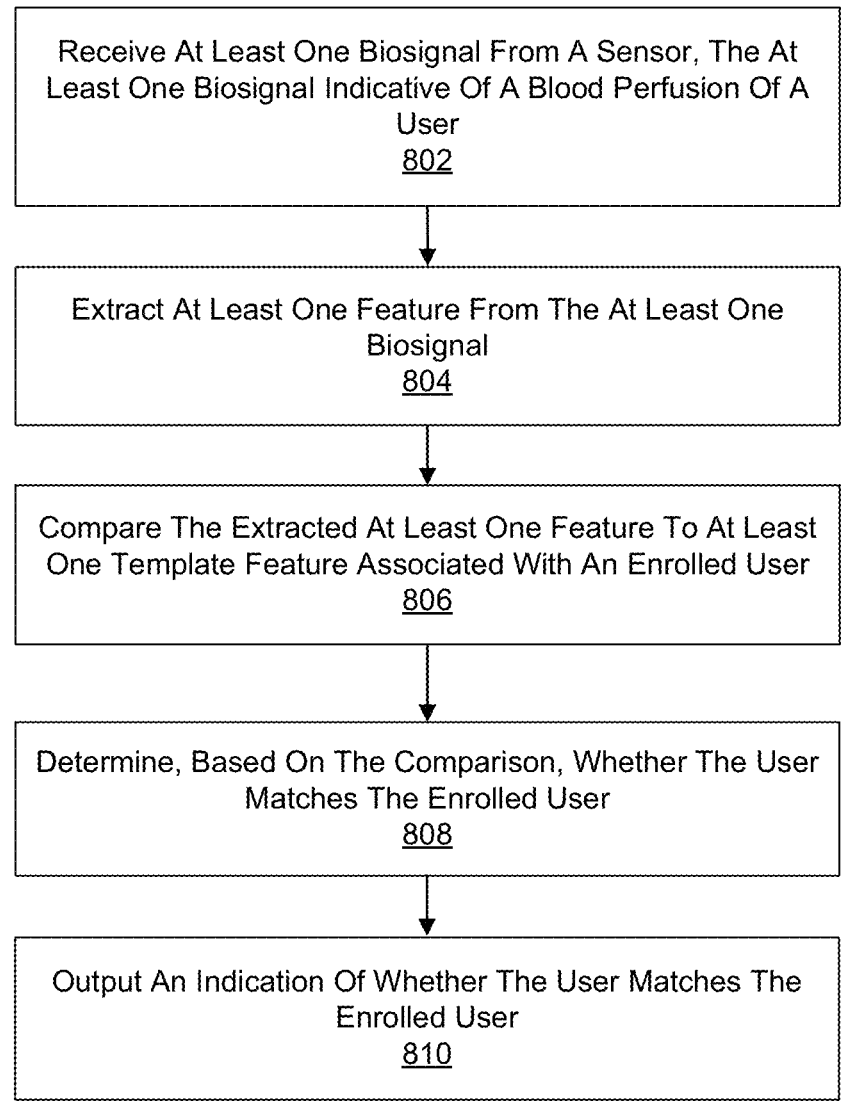
FIG. 8 is a flow diagram for a process for user identification, in accordance with aspects of the present disclosure.

FIG. 8 is a flow diagram for a process 800 for user identification, in accordance with aspects of the present disclosure. The process 800 may be performed by a computing device (or apparatus) or a component (e.g., a chipset, codec, etc.) of the computing device. The computing device may be a mobile device (e.g., a mobile phone), a network-connected wearable device such as a watch, an extended reality (XR) device such as a virtual reality (VR) device or augmented reality (AR) device, a vehicle or component or system of a vehicle, or other type of computing device. In some cases, the computing device may be or may include, for example, SOC 100, or biomarker sensory system 200. The operations of the process 800 may be implemented as software components that are executed and run on one or more processors.

At block 802, the computing device (or component thereof) may receive at least one biosignal from a sensor, the at least one biosignal indicative of a blood perfusion of a user. In some cases, the sensor comprises a photoacoustic plethysmography sensor. In some cases, the computing device (or component thereof) may receive a plurality of biosignals over a period of time and combine the plurality of biosignals into the at least one biosignal.

At block 804, the computing device (or component thereof) may extract at least one feature from the at least one biosignal. In some cases, the at least one feature is based on a number of times a value of the at least one biosignal crosses a value of zero. In some cases, the at least one feature is based on an expected range of values for the at least one biosignal. At block 806, the computing device (or component thereof) may compare the extracted at least one feature to at least one template feature associated with an enrolled user.

At block 808, the computing device (or component thereof) may determine, based on comparing the extracted at least one feature to the at least one template feature, whether the user matches the enrolled user. In some cases, the computing device (or component thereon) may divide the at least one biosignal into two or more segments. In some cases, the at least one feature is based on a distance between a highest value of a biosignal in a segment of the two or more segments, and a lowest value of the biosignal in the segment. In some cases, the at least one feature is based on a slope between a first value of a biosignal in a segment of the two or more segments, and a last value of the biosignal in the segment. At block 810, the computing device (or component thereof) may output an indication of whether the user matches the enrolled user.

Figure 9:
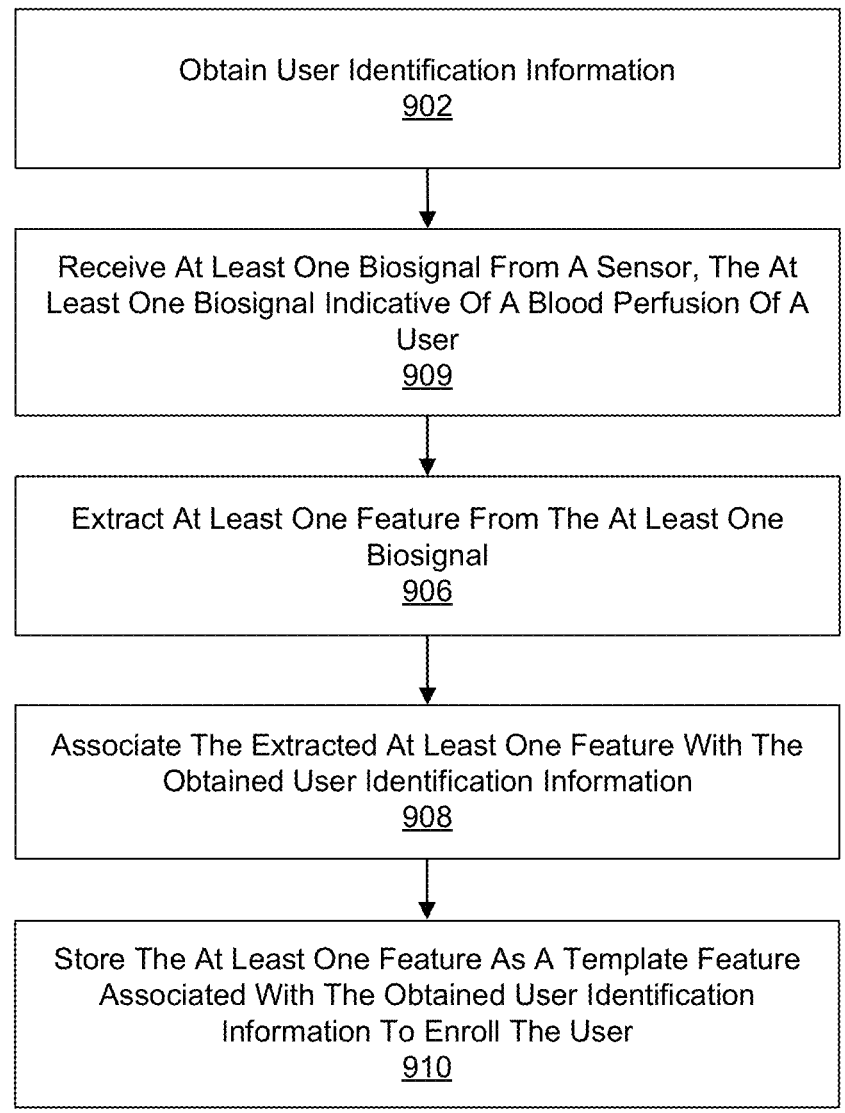
FIG. 9 is a flow diagram for a process for user identification, in accordance with aspects of the present disclosure.

FIG. 9 is a flow diagram for a process 900 for user identification, in accordance with aspects of the present disclosure. The process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. In some cases, the computing device may be or may include, for example, SOC 100, or biomarker sensory system 200. The operations of the process 900 may be implemented as software components that are executed and run on one or more processors.

At block 902, the computing device (or component thereof) may obtain user identification information. At block 904 the computing device (or component thereof) may receive at least one biosignal from a sensor, the at least one biosignal indicative of a blood perfusion of a user. In some cases, sensor comprises a photoacoustic plethysmography sensor. In some cases, the computing device (or component thereof) may receive a plurality of biosignals over a period of time and combine the plurality of biosignals into the at least one biosignal.

At block 906, the computing device (or component thereof) may extract at least one feature from the at least one biosignal. In some cases, the computing device (or component thereof) may divide the at least one biosignal into two or more segments. In some cases, the at least one feature is based on a distance between a highest value of a biosignal in a segment of the two or more segments, and a lowest value of the biosignal in the segment. In some cases, the at least one feature is based on a slope between a first value of a biosignal in a segment of the two or more segments, and a last value of the biosignal in the segment. In some cases, the at least one feature is based on a number of times a value of the at least one biosignal crosses a value of zero. In some cases, the at least one feature is based on an expected range of values for the at least one biosignal.

At block 908, the computing device (or component thereof) may associate the extracted at least one feature with the obtained user identification information. At block 910, the computing device (or component thereof) may store the at least one feature as a template feature associated with the obtained user identification information to enroll the user.

Figure 10:
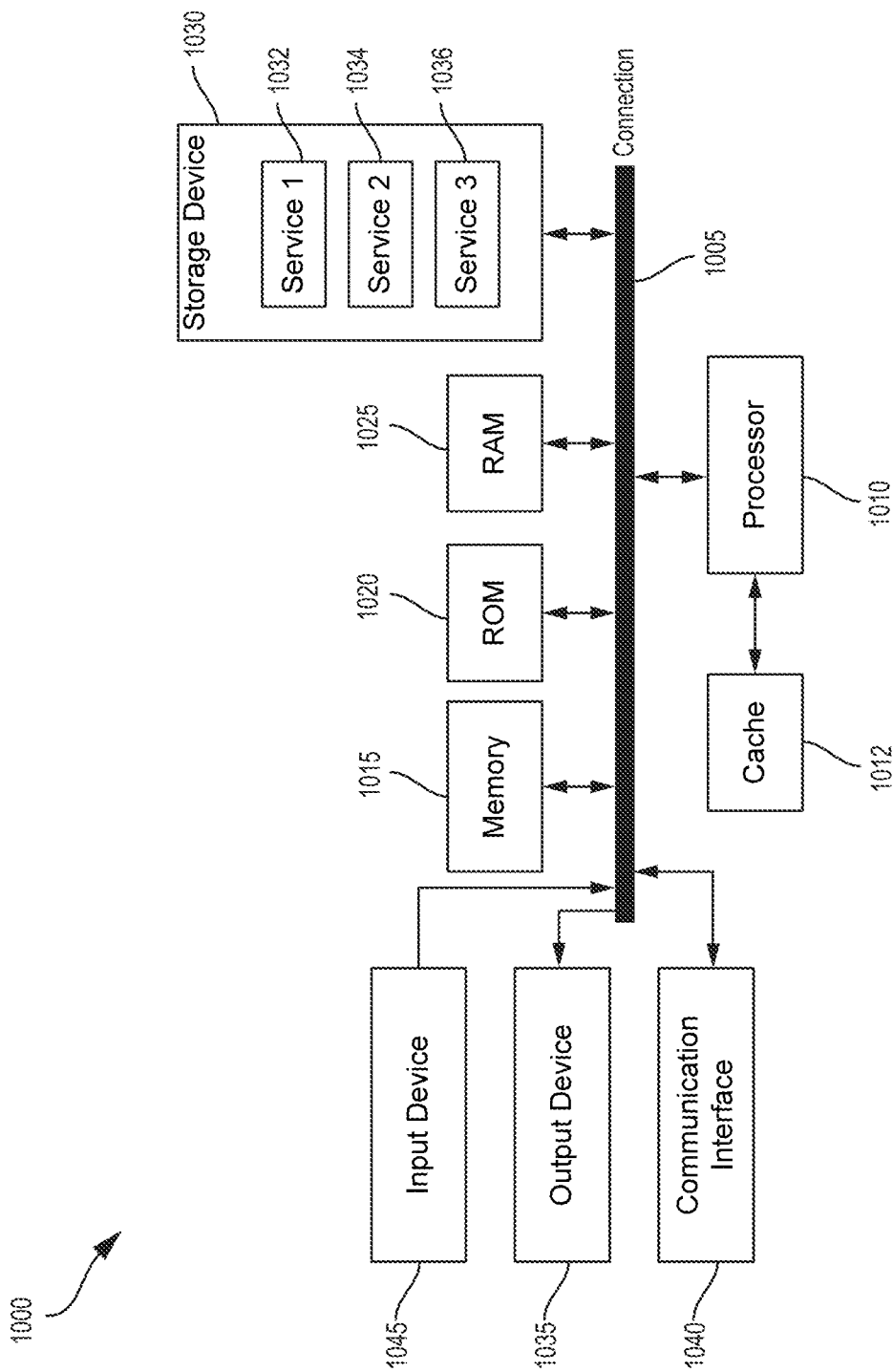
FIG. 10 illustrates an example computing device architecture of an example computing device which can implement the various techniques described herein.

FIG. 10 illustrates an example computing device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1000 may include SOC 100 of FIG. 1. The components of computing device architecture 1000 are shown in electrical communication with each other using connection 1005, such as a bus. The example computing device architecture 1000 includes a processing unit (CPU or processor) 1010 and computing device connection 1005 that couples various computing device components including computing device memory 1015, such as read only memory (ROM) 1020 and random access memory (RAM) 1025, to processor 1010.

Computing device architecture 1000 can include a cache of high-speed memory connected directly with, in close proximity to, or integrated as part of processor 1010. Computing device architecture 1000 can copy data from memory 1015 and/or the storage device 1030 to cache 1012 for quick access by processor 1010. In this way, the cache can provide a performance boost that avoids processor 1010 delays while waiting for data. These and other modules can control or be configured to control processor 1010 to perform various actions. Other computing device memory 1015 may be available for use as well. Memory 1015 can include multiple different types of memory with different performance characteristics. Processor 1010 can include any general purpose processor and a hardware or software service, such as service 1 1032, service 2 1034, and service 3 1036 stored in storage device 1030, configured to control processor 1010 as well as a special-purpose processor where software instructions are incorporated into the processor design. Processor 1010 may be a self-contained system, containing multiple cores or processors, a bus, memory controller, cache, etc. A multi-core processor may be symmetric or asymmetric.

To enable user interaction with the computing device architecture 1000, input device 1045 can represent any number of input mechanisms, such as a microphone for speech, a touch-sensitive screen for gesture or graphical input, keyboard, mouse, motion input, speech and so forth. Output device 1035 can also be one or more of a number of output mechanisms known to those of skill in the art, such as a display, projector, television, speaker device, etc. In some instances, multimodal computing devices can enable a user to provide multiple types of input to communicate with computing device architecture 1000. Communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. Storage device 1030 can include services 1032, 1034, 1036 for controlling processor 1010. Other hardware or software modules are contemplated. Storage device 1030 can be connected to the computing device connection 1005. In one aspect, a hardware module that performs a particular function can include the software component stored in a computer-readable medium in connection with the necessary hardware components, such as processor 1010, connection 1005, output device 1035, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for user identification, the apparatus comprising: at least one memory comprising instructions; and at least one processor coupled to the at least one memory and configured to: receive at least one biosignal from a sensor, the at least one biosignal indicative of a blood perfusion of a user; extract at least one feature from the at least one biosignal; compare the extracted at least one feature to at least one template feature associated with an enrolled user; determine, based on comparing the extracted at least one feature to the at least one template feature, whether the user matches the enrolled user; and output an indication of whether the user matches the enrolled user.

Aspect 2. The apparatus of aspect 1, wherein the sensor comprises a photoacoustic plethysmography sensor.

Aspect 3. The apparatus of any of aspects 1-2, wherein the at least one processor is further configured: receive a plurality of biosignals over a period of time; and combine the plurality of biosignals into the at least one biosignal.

Aspect 4. The apparatus of any of aspects 1-3, wherein the at least one processor is configured to divide the at least one biosignal into two or more segments.

Aspect 5. The apparatus of aspect 4, wherein the at least one feature is based on a distance between a highest value of a biosignal in a segment of the two or more segments, and a lowest value of the biosignal in the segment.

Aspect 6. The apparatus of aspect 4, wherein the at least one feature is based on a slope between a first value of a biosignal in a segment of the two or more segments, and a last value of the biosignal in the segment.

Aspect 7. The apparatus of any of aspects 1-6, wherein the at least one feature is based on a number of times a value of the at least one biosignal crosses a value of zero.

Aspect 8. The apparatus of any of aspects 1-7, wherein the at least one feature is based on an expected range of values for the at least one biosignal.

Aspect 9. An apparatus for user identification, the apparatus comprising: at least one memory comprising instructions; and at least one processor coupled to the at least one memory and configured to: obtain user identification information; receive at least one biosignal from a sensor, the at least one biosignal indicative of a blood perfusion of a user; extract at least one feature from the at least one biosignal; associate the extracted at least one feature with the obtained user identification information; and store the at least one feature as a template feature associated with the obtained user identification information to enroll the user.

Aspect 10. The apparatus of aspect 9, wherein the sensor comprises a photoacoustic plethysmography sensor.

Aspect 11. The apparatus of any of aspects 9-10, wherein the at least one processor is further configured to: receive a plurality of biosignals over a period of time; and combine the plurality of biosignals into the at least one biosignal.

Aspect 12. The apparatus of any of aspects 9-11, wherein the at least one processor is further configured to divide the at least one biosignal into two or more segments.

Aspect 13. The apparatus of aspect 12, wherein the at least one feature is based on a distance between a highest value of a biosignal in a segment of the two or more segments, and a lowest value of the biosignal in the segment.

Aspect 14. The apparatus of aspect 12, wherein the at least one feature is based on a slope between a first value of a biosignal in a segment of the two or more segments, and a last value of the biosignal in the segment.

Aspect 15. The apparatus of any of aspects 9-14, wherein the at least one feature is based on a number of times a value of the at least one biosignal crosses a value of zero.

Aspect 16. The apparatus of any of aspects 9-15, wherein the at least one feature is based on an expected range of values for the at least one biosignal.

Aspect 17. A method for user identification, comprising: receiving at least one biosignal from a sensor, the at least one biosignal indicative of a blood perfusion of a user; extracting at least one feature from the at least one biosignal; comparing the extracted at least one feature to at least one template feature associated with an enrolled user; determining, based on comparing the extracted at least one feature to the at least one template feature, whether the user matches the enrolled user; and outputting an indication of whether the user matches the enrolled user.

Aspect 18. The method of aspect 17, wherein the sensor comprises a photoacoustic plethysmography sensor.

Aspect 19. The method of any of aspects 17-18, further comprising: receiving a plurality of biosignals over a period of time; and combining the plurality of biosignals into the at least one biosignal.

Aspect 20. The method of any of aspects 17-19, further comprising dividing the at least one biosignal into two or more segments.

Aspect 21. The method of aspect 20, wherein the at least one feature is based on a distance between a highest value of a biosignal in a segment of the two or more segments, and a lowest value of the biosignal in the segment.

Aspect 22. The method of aspect 20, wherein the at least one feature is based on a slope between a first value of a biosignal in a segment of the two or more segments, and a last value of the biosignal in the segment.

Aspect 23. The method of any of aspects 17-23, wherein the at least one feature is based on a number of times a value of the at least one biosignal crosses a value of zero.

Aspect 24. The method of any of aspects 17-23, wherein the at least one feature is based on an expected range of values for the at least one biosignal.

Aspect 25. A method for user identification, comprising: obtaining user identification information; receiving at least one biosignal from a sensor, the at least one biosignal indicative of a blood perfusion of a user; extracting at least one feature from the at least one biosignal; associating the extracted at least one feature with the obtained user identification information; and storing the at least one feature as a template feature associated with the obtained user identification information to enroll the user.

Aspect 26. The method of aspect 25, wherein the sensor comprises a photoacoustic plethysmography sensor.

Aspect 27. The method of any of aspects 25-26, further comprising: receiving a plurality of biosignals over a period of time; and combining the plurality of biosignals into the at least one biosignal.

Aspect 28. The method of any of aspects 25-27, further comprising dividing the at least one biosignal into two or more segments.

Aspect 29. The method of aspect 28, wherein the at least one feature is based on a distance between a highest value of a biosignal in a segment of the two or more segments, and a lowest value of the biosignal in the segment.

Aspect 30. The method of aspect 28, wherein the at least one feature is based on a slope between a first value of a biosignal in a segment of the two or more segments, and a last value of the biosignal in the segment.

Aspect 31. The method of any of aspects 25-30, wherein the at least one feature is based on a number of times a value of the at least one biosignal crosses a value of zero.

Aspect 32. The method of any of aspects 25-31, wherein the at least one feature is based on an expected range of values for the at least one biosignal.

Aspect 33. A non-transitory computer-readable medium having stored thereon instructions that, when executed by at least one processor, cause the at least one or more processors to: receive at least one biosignal from a sensor, the at least one biosignal indicative of a blood perfusion of a user; extract at least one feature from the at least one biosignal; compare the extracted at least one feature to at least one template feature associated with an enrolled user; determine, based on comparing the extracted at least one feature to the at least one template feature, whether the user matches the enrolled user; and output an indication of whether the user matches the enrolled user.

Aspect 34. The non-transitory computer-readable medium of aspect 33, wherein the sensor comprises a photoacoustic plethysmography sensor.

Aspect 35. The non-transitory computer-readable medium of any of aspects 33-34, wherein the instructions further cause the at least one processor to: receive a plurality of biosignals over a period of time; and combine the plurality of biosignals into the at least one biosignal.

Aspect 36. The non-transitory computer-readable medium of any of aspects 33-35, wherein the instructions further cause the at least one processor to divide the at least one biosignal into two or more segments.

Aspect 37. The non-transitory computer-readable medium of aspect 36, wherein the at least one feature is based on a distance between a highest value of a biosignal in a segment of the two or more segments, and a lowest value of the biosignal in the segment.

Aspect 38. The non-transitory computer-readable medium of aspect 36, wherein the at least one feature is based on a slope between a first value of a biosignal in a segment of the two or more segments, and a last value of the biosignal in the segment.

Aspect 39. The non-transitory computer-readable medium of any of aspects 33-38, wherein the at least one feature is based on a number of times a value of the at least one biosignal crosses a value of zero.

Aspect 40. The non-transitory computer-readable medium of any of aspects 33-39, wherein the at least one feature is based on an expected range of values for the at least one biosignal.

Aspect 41. A non-transitory computer-readable medium having stored thereon instructions that, when executed by at least one processor, cause the at least one or more processors to: obtain user identification information; receive at least one biosignal from a sensor, the at least one biosignal indicative of a blood perfusion of a user; extract at least one feature from the at least one biosignal; associate the extracted at least one feature with the obtained user identification information; and store the at least one feature as a template feature associated with the obtained user identification information to enroll the user.

Aspect 42. The non-transitory computer-readable medium of aspect 41, wherein the sensor comprises a photoacoustic plethysmography sensor.

Aspect 43. The non-transitory computer-readable medium of any of aspects 41-42, wherein the instructions further cause the at least one processor to: receive a plurality of biosignals over a period of time; and combine the plurality of biosignals into the at least one biosignal.

Aspect 44. The non-transitory computer-readable medium of any of aspects 41-43, wherein the instructions further cause the at least one processor to divide the at least one biosignal into two or more segments.

Aspect 45. The non-transitory computer-readable medium of aspect 444, wherein the at least one feature is based on a distance between a highest value of a biosignal in a segment of the two or more segments, and a lowest value of the biosignal in the segment.

Aspect 46. The non-transitory computer-readable medium of aspect 44, wherein the at least one feature is based on a slope between a first value of a biosignal in a segment of the two or more segments, and a last value of the biosignal in the segment.

Aspect 47. The non-transitory computer-readable medium of any of aspects 41-46, wherein the at least one feature is based on a number of times a value of the at least one biosignal crosses a value of zero.

Aspect 48. The non-transitory computer-readable medium of any of aspects 41-47, wherein the at least one feature is based on an expected range of values for the at least one biosignal.

Aspect 49. An apparatus comprising means for performing a method according to any of Aspects 17 to 24.

Aspect 50. An apparatus comprising means for performing a method according to any of Aspects 25 to 32.

What is claimed is:

1. An apparatus for user identification, the apparatus comprising:
    at least one memory comprising instructions;
    a photoacoustic plethysmography sensor configured to capture a plurality of biosignals over a period of time, the plurality of biosignals indicative of a blood perfusion of an enrolled user of the apparatus, wherein the plurality of biosignals are captured photoacoustically; and
    at least one processor coupled to the at least one memory and configured to:
        obtain the plurality of biosignals from the photoacoustic plethysmography sensor;
        combine the plurality of biosignals to determine an expected range of feature values for the plurality of biosignals;
        store, in the at least one memory, the expected range of feature values for the plurality of biosignals in at least one template for the enrolled user;
        obtain at least one additional biosignal from the photoacoustic plethysmography sensor, the at least one additional biosignal indicative of a blood perfusion of a user of the apparatus;
        determine at least one feature from the at least one additional biosignal;
        determine whether the at least one feature falls within the expected range of feature values stored in the at least one template for the enrolled user;
        determine, based on determining whether the at least one feature falls within the expected range of feature values stored in the at least one template, whether the user matches the enrolled user; and
        output an indication of whether the user matches the enrolled user.

2. The apparatus of claim 1, wherein the photoacoustic plethysmography sensor includes a light emitter and an ultrasonic receiver.

3. The apparatus of claim 1, wherein the at least one processor is configured to divide the at least one additional biosignal into two or more segments.

4. The apparatus of claim 3, wherein the at least one feature is based on a distance between a highest value of a biosignal in a segment of the two or more segments, and a lowest value of the biosignal in the segment.

5. The apparatus of claim 3, wherein the at least one feature is based on a slope between a first value of a biosignal in a segment of the two or more segments, and a last value of the biosignal in the segment.

6. The apparatus of claim 1, wherein the at least one feature is based on a number of times a value of the at least one additional biosignal crosses a value of zero.

7. The apparatus of claim 1, wherein the at least one processor is further configured to compare the determined at least one feature to the at least one template using a machine learning (ML) model trained based on features obtained from a biosignal to compare the biosignal to one or more features of the at least one template.

8. The apparatus of claim 1, wherein the photoacoustic plethysmography sensor is configured to capture the plurality of biosignals via an ultrasonic receiver based on photoacoustic emissions in response to light emitted by the photoacoustic plethysmography sensor.

9. An apparatus for user identification, the apparatus comprising:
at least one memory comprising instructions;
a photoacoustic plethysmography sensor configured to capture a plurality of biosignals over a period of time, the plurality of biosignals indicative of a blood perfusion of a user, wherein the plurality of biosignals are obtained photoacoustically; and
at least one processor coupled to the at least one memory and configured to:
obtain user identification information of the user;
receive the plurality of biosignals from the photoacoustic plethysmography sensor;
determine at least one feature from each biosignal of the plurality of biosignals;
combine the at least one feature determined from each biosignal of the plurality of biosignals to determine an expected range of feature values for the plurality of biosignals;
associate the expected range of feature values with the obtained user identification information; and
store, in the at least one memory, the expected range of feature values as at least one template feature associated with the obtained user identification information to enroll the user.

10. The apparatus of claim 9, wherein the photoacoustic plethysmography sensor includes a light emitter and an ultrasonic receiver.

11. The apparatus of claim 9, wherein the at least one processor is further configured to divide at least one biosignal from the plurality of biosignals into two or more segments.

12. The apparatus of claim 11, wherein the at least one feature is based on a distance between a highest value of a biosignal in a segment of the two or more segments, and a lowest value of the biosignal in the segment.

13. The apparatus of claim 11, wherein the at least one feature is based on a slope between a first value of a biosignal in a segment of the two or more segments, and a last value of the biosignal in the segment.

14. The apparatus of claim 9, wherein the at least one feature is based on a number of times a value of at least one biosignal from the plurality of biosignals crosses a value of zero.

15. The apparatus of claim 9, wherein the at least one processor is further configured to generate a model of features obtained from the plurality of biosignals for comparing one or more biosignal features to the at least one template feature for identifying the user.

16. A method for user identification, comprising:
capture, using a photoacoustic plethysmography sensor, a plurality of biosignals over a period of time, the plurality of biosignals indicative of a blood perfusion of an enrolled user, wherein plurality of biosignals are captured photoacoustically;
combine the plurality of biosignals to determine an expected range of feature values for the plurality of biosignals;
storing, in at least one memory, the expected range of feature values for the plurality of biosignals in at least one template for the enrolled user;
capture, using the photoacoustic plethysmography sensor, at least one additional biosignal indicative of a blood perfusion of a user;
determining at least one feature from the at least one additional biosignal;
determining whether the at least one feature falls within the expected range of feature values stored in the at least one template for the enrolled user;
determining, based on determining whether the at least one feature falls within the expected range of feature values stored in the at least one template, whether the user matches the enrolled user; and
outputting an indication of whether the user matches the enrolled user.

17. The method of claim 16, wherein the photoacoustic plethysmography sensor includes a light emitter and an ultrasonic receiver.

18. The method of claim 16, further comprising dividing the at least one additional biosignal into two or more segments.

19. The method of claim 18, wherein the at least one feature is based on a distance between a highest value of a biosignal in a segment of the two or more segments, and a lowest value of the biosignal in the segment.

20. The method of claim 18, wherein the at least one feature is based on a slope between a first value of a biosignal in a segment of the two or more segments, and a last value of the biosignal in the segment.

21. The method of claim 16, wherein the at least one feature is based on a number of times a value of the at least one additional biosignal crosses a value of zero.

22. The method of claim 16, further comprising generating a model of features obtained from the plurality of biosignals for comparing one or more biosignal features to the at least one template for identifying the user.

23. A method for user identification, comprising:
obtaining user identification information;
capture, using a photoacoustic plethysmography sensor, a plurality of biosignals over a period of time, the plurality of biosignals indicative of a blood perfusion of a user, wherein the plurality of biosignals are obtained photoacoustically;
determining at least one feature from each biosignal of the plurality of biosignals;
combine the at least one feature determined from each biosignal of the plurality of biosignals to determine an expected range of feature values for the plurality of biosignals;
associating the expected range of feature values with the obtained user identification information; and storing the expected range of feature values as at least one template feature associated with the obtained user identification information to enroll the user.

24. The method of claim 23, wherein the photoacoustic plethysmography sensor includes a light emitter and an ultrasonic receiver.

25. The method of claim 23, further comprising dividing at least one biosignal from the plurality of biosignals into two or more segments.

26. The method of claim 25, wherein the at least one feature is based on a distance between a highest value of a biosignal in a segment of the two or more segments, and a lowest value of the biosignal in the segment.

27. The method of claim 25, wherein the at least one feature is based on a slope between a first value of a biosignal in a segment of the two or more segments, and a last value of the biosignal in the segment.

28. The method of claim 23, wherein the at least one feature is based on a number of times a value of at least one biosignal from the plurality of biosignals crosses a value of zero.

* * * * *